3,004,056
SURFACE ACTIVE COMPOSITIONS
Leslie G. Nunn, Jr., Metuchen, N.J., and Stanley H. Hesse, Bethlehem, Pa., assignors to General Aniline & Film Corporation, New York, N.Y., a corporation of Delaware
No Drawing. Filed Nov. 12, 1959, Ser. No. 852,188
12 Claims. (Cl. 260—461)

This invention relates to the production of surface active compositions, and more particularly to the production of surface active compositions containing mixtures of primary and secondary phosphate esters of hydroxylic organic compounds.

Hydroxylic organic compounds have been previously esterified with a number of different phosphating agents including phosphoric acid, $P_2O_5$, $PCl_3$, and $POCl_3$ and the like. While such processes have in some instances produced surface active compounds or compositions, they have been commonly subject to a number of procedural disadvantages and/or have failed to produce a surface active product having optimum properties for certain end uses. Thus, the use of $PCl_3$, or $POCl_3$ as the phosphating agent yields products containing bound chlorine atoms, and in addition requires careful manipulation to remove the HCl produced during the reaction. Further, this HCl raises problems of corrosion. The use of phosphoric acid or solutions of $P_2O_5$ in phosphoric acid as phosphating agent generally yields inconsistent mixtures of different types of esters, including esters of pyrophosphoric acid, phosphoric acid, primary, secondary and tertiary phosphates, and the like. When $P_2O_5$ has been employed, considerably greater molar ratios of the hydroxy compounds were regarded as necessary to bring the solid $P_2O_5$ into solution.

It is an object of this invention to provide a process which will not be subject to the above mentioned disadvantages. Another object of this invention is the provision of a novel mixture of primary and secondary phosphate esters having highly desirable surface active properties. Other objects and advantages will appear as the description proceeds.

The attainment of the above objects is made possible by the process of this invention, which broadly comprises reacting one mole of $P_2O_5$ with 2 to 4.5 moles of a nonionic surface active agent having the molecular configuration of a condensation product of at least one mole of ethylene oxide with one mole of a compound containing at least 6 carbon atoms and a reactive hydrogen atom under substantially anhydrous conditions and at a temperature below about 110° C. This process does not require the use of an excess of the hydroxylic organic compound (in this instance the defined nonionic surface active agent), in order to bring the $P_2O_5$ into solution. Substantially no tertiary phosphate ester is formed by this process and little or no $P_2O_5$ remains in the composition. Depending upon the particular ratio of $P_2O_5$ to the nonionic surface active agent employed, and the nature of such nonionic, the product may in some instances contain some unreacted nonionic surface active agent which for certain uses is actually advantageous.

For similar reasons, the proportions of secondary phosphate ester:primary ester:free nonionic in the products of this invention will in general fall within the range of about 20 to 45% secondary ester:30-80% primary ester:0-40% nonionic, by weight.

The nonionic surface active agents employed as reactants in the present invention are well known in the art and are disclosed along with suitable methods for their preparation in numerous patents and other publications. In general, they may be obtained by condensing a polyglycol ether containing the required number of alkenoxy groups or an alkylene oxide such as propylene oxide, butylene oxide, or preferably ethylene oxide, with an organic compound containing a reactive hydrogen atom. As such compounds containing a reactive hydrogen atom there may be mentioned alcohols, phenols, thiols, primary and secondary amines, and carboxylic and sulfonic acids and their amides. The amount of alkylene oxide or equivalent condensed with the reactive hydrogen-containing compound, i.e. the length of the polyoxyalkylene chain, will depend primarily upon the particular compound with which it is condensed. As a convenient rule of thumb, an amount of alkylene oxide or equivalent should be employed which will result in a condensation product containing about 20 to 85% by weight of combined alkylene oxide. However, the optimum amount of alkylene oxide for attainment of the desired hydrophobic-hydrophilic balance may be readily determined in any particular case by preliminary test and routine experimentation.

A preferred group of nonionic surface active agents useful as reactants in the present invention are those derived from alkyl phenolic compounds. Numerous compounds of this type, i.e. polyalkylene oxide derivatives of phenolic compounds containing one or more alkyl substituents are described in U.S. Patents 2,213,477 and 2,593,112. Those preferred are the polyalkylene oxide derivatives of alkyl phenolic compounds in which the total number of alkyl carbon atoms is between 4 and 20. As examples of such phenolic compounds may be mentioned normal and isomeric butyl, amyl, dibutyl, and diamyl phenols and cresols, tripropyl phenols and cresols, heptyl, octyl, nonyl, decyl, undecyl, dodecyl, tetradecyl, cetyl, oleyl, octadecyl and the like, phenols and cresols in addition to dihexyl- and trihexyl-phenol prepared from hexene-1 and phenol, diisoheptyl-phenol, dioctyl-phenol, dinonyl-phenol, dioctyl-p-cresol, dioctyl-o-cresol, didecyl-phenol, didecyl-p-cresol, didodecyl-phenol, and the like. Of particular value are the polyalkylene oxide derivatives of secondary and tertiary alkyl substituted phenols and cresols obtained by condensing olefines of the type obtained in petroleum refining with phenols or cresols. In the case of products obtained by condensing phenol or cresol with olefines of from 3 to 5 carbon atoms such as propylene, butylene or amylene, it is sometimes desirable to employ the dialkylated phenols or cresols, while in the case of compounds obtained by condensing a phenol or cresol with an olefine containing 8 or more carbon atoms, the mono-substituted derivatives are sometimes preferred. Particularly desirable derivatives can be obtained from the phenols and cresols containing a substituent derived from olefines containing from 8 to 18 carbon atoms, such as diisobutylene and other alkylenes as nonylene, decylene, undecylene, dodecylene, pentadecylene, octadecylene and mixtures thereof, and may advantageously be the dimers and trimers obtained by polymerization of such low molecular weight olefines as propylene, butylene, isobutylene, amylene or mixtures thereof.

However, the polyalkylene oxide derivatives of other organic compounds containing an active hydrogen may be employed as reactants in the present invention. Thus, the polyalkylene oxide derivatives, described in U.S. Patent 1,970,578, of aliphatic organic hydroxy compounds, may be employed if desired. As examples of water-insoluble higher fatty acids whose polyalkylene oxide derivatives may be employed may be mentioned lauric, oleic, ricinoleic, palmitic and stearic acid, and the like, or mixtures thereof, such as the mixtures obtained from animal and vegetable fats and oils or by the oxidation of such petroleum fractions as paraffin wax. As another preferred group there may also be employed polyalkylene oxide derivatives of water insoluble aliphatic hydroxy compounds such as higher aliphatic alcohols of at least 10 carbon atoms, i.e. the alcohols corresponding to the fatty acids specified immediately above, particularly the alcohols obtainable by hydrogenation of the fatty acids or glycerides present in animal or vegetable oils and waxes such as coconut oil, castor oil, and the like, as well as the polyalkylene oxide derivatives of the animal and vegetable oils, fats and waxes themselves. There may also be used polyalkylene oxide derivatives of organic mercapto compounds such as the products described in U.S. Patent 2,205,021, i.e. the polyalkylene oxide derivatives of such mercapto compounds as dodecyl mercaptan, oleyl mercaptan, cetyl mercaptan, decyl mercaptan and thiophenols, thionaphthols, benzo-mercaptan, etc.; also the polyalkylene oxide derivatives of carboxylic acid amides such as those described in U.S. Patent 2,085,706, and of sulfonamides of the type described in U.S. Patent 2,002,613, or the polyalkylene oxide derivatives, described in U.S. Patent 2,266,141, or sulfonic acids may be employed if desired. Similarly, the surface active polyalkylene oxide derivatives disclosed in U.S. Patent 2,677,700 may also be employed in the instant invention.

Another group of nonionic surface active agents which may be employed as reactants herein are those of the Pluronic type as disclosed for example in U.S. Patent 2,674,619 and other patents. In general, in preparing these agents a suitable 1,2-alkylene oxide or substituted alkylene oxide, as for example butylene oxide, amylene oxide, phenyl ethylene oxide (oxystyrene), cyclohexene oxide, cyclooctene oxide, or preferably propylene oxide, or a mixture thereof, is polymerized in the presence of an alkaline catalyst such as sodium hydroxide, preferably at elevated temperatures and pressures to produce the corresponding water insoluble polypropylene glycol or substituted polypropylene glycol having a molecular weight of about 300 to 3000. Said polyglycol is then reacted under similar conditions with the required number of moles of ethylene oxide to yield the desired nonionic surface active agents employed herein. These agents should generally have a molecular weight ranging from about 1200 to 15,000 and preferably about 2000 to 10,000. Alternatively, ethylene diamine, propylene diamine, other alkylene diamines and polyalkylene polyamines, in addition to ethylene glycol, propylene glycol, 1,4-butanediol, hexamethylene glycol and other diols may be reacted with the required number of moles of propylene oxide or substituted propylene oxide to produce the corresponding water-insoluble polypropylene glycols and substituted polypropylene glycols having a molecular weight of about 300 to 3000 as described above, followed by reaction with the required number of moles of ethylene oxide. It will be understood that these Pluronic types of non-ionic surface active agents will ordinarily be of the diol type containing two terminal hydroxy (ethanol) groups. One of these terminal hydroxy groups may be blocked by reaction with an etherifying agent, esterifying agent, or the like prior to phosphation in accordance with the process of this invention. However, if not so blocked or protected, it may in some instances be advisable to increase the proportion of this nonionic surface active agent employed in the present phosphation reaction to up to double the proportions referred to above. Whether blocked or unblocked, these agents will generally produce a more complex mixture of reaction products due to a tendency towards chaining, cross linking, and/or ring closing, and the like.

Another preferred group of nonionic surface active agents useful as reactants in the present invention are the condensation products of at least one mole of ethylene oxide with one mole of a multi-branched chain primary aliphatic alcohol having the molecular configuration of an alcohol produced by the Oxo process from a polyolefin of at least 7 carbon atoms. Such alcohols are prepared by the catalytic reaction of a polyolefin such as tripropylene, tetrapropylene, pentapropylene, diisobutylene, triisobutylene, tetraisobutylene, propylene-isobutylene and tributene and the like with carbon monoxide and hydrogen to form an aldehyde followed by catalytic reduction of this aldehyde to a primary alcohol. This two stage process is well known as the Oxo process and alcohols produced by such process may be designated as Oxo alcohols. A particularly preferred alcohol of this type is the Oxo tridecyl alcohol produced from tetrapropylene or triisobutylene. These alcohols are reacted with the required number of moles of ethylene oxide to produce nonionic surface active agents effective as reactants herein.

The following is an illustrative, non-limitative list of some specific examples of suitable nonionic surface active agents which may be employed as reactants in the present invention. In this list, "E.O." means "ethylene oxide" and the number preceding same refers to the number of moles thereof reacted with one mole of the given reactive hydrogen-containing compound.

Nonylphenol+9–11 E.O.
Nonylphenol+2 E.O.
Dinonylphenol+7 E.O.
Dodecylphenol+18 E.O.
Castor oil+20 E.O.
Tall oil+18 E.O.
Oleyl alcohol+20 E.O.
Lauryl alcohol+4 E.O.
Lauryl alcohol+15 E.O.
Hexadecyl alcohol+12 E.O.
Hexadecyl alcohol+20 E.O.
Octadecyl alcohol+20 E.O.
Oxo tridecyl alcohol:
    (from tetrapropylene)+7 E.O.
    (from tetrapropylene)+10 E.O.
    (from tetrapropylene)+15 E.O.
Dodecyl mercaptan+9 E.O.
Soya bean oil amine+10 E.O.
Rosin amine+32 E.O.
Cocoanut fatty acid amine+7 E.O.
Cocoa fatty acid+10 E.O.
Dodecylbenzene sulfonamide+10 E.O.
Decyl sulfonamide+6 E.O.
Oleic acid+5 E.O.
Polypropylene glycol (30 oxypropylene units)+10 E.O.

In carrying out the phosphation reaction in accordance with this invention, the $P_2O_5$ is preferably added gradually, with vigorous agitation, to the nonionic surface active agent in liquid form. If the latter agent is a solid at room temperature, it should be heated to above its melting point. Addition of the nonionic surface active agent to the $P_2O_5$ is inadvisable since this has been found to result in the formation of tar and the like and to prevent the reaction from proceeding to completion. The reaction is exothermic and in some cases cooling is necessary to prevent the temperature from going above about 110° C. since this tends to produce discolored and darkened products. The reaction proceeds continously during addition of the $P_2O_5$ and solution thereof in the nonionic surface active agent, and is substantially 90% complete or more by the time all of the $P_2O_5$ has been added. The few particles of solid $P_2O_5$ remaining in the reaction medium may be removed at this point if time is of the essence, but it is preferred in the interests of economy to allow the reaction to proceed for an additional period of time which may range from ½ to 5 hours or more at ambient temperatures up to about 110° C. until all of the $P_2O_5$ has dissolved indicating complete reaction between the reactants involved. Vigorous agitation during the reaction is highly desirable to facilitate and expedite completion of the reaction.

It is an advantageous feature of this invention that the $P_2O_5$ may be employed in dry, solid form as a granular powder or other finely divided or particulate form, for reaction with the above defined nonionic surface active agents. However, if desired, the $P_2O_5$ may first be dispersed in an inert organic diluent such as benzene, xylene, ether, pentane, or low and high boiling hydrocarbon fractions.

After completion of the reaction, the reaction mixture may be cooled and discharged. If carried out under rigid anhydrous conditions, the product should consist of a mixture of the primary and secondary phosphate esters of the nonionic surface active agent combined, depending upon the proportions of reactants, in some instances with a small proportion of unreacted nonionic surface active agent. Any small amount of water present in the reaction mixture will result pro tanto in the formation of some phosphoric acid in the product. The degree of esterification in the product may be determined by potentiometric titration or by titration with alkali to methyl orange and then to phenolphthalein.

The products of this invention may be supplied in free unneutralized form, or in the form of the partially or completely neutralized salts containing as cations alkali metals, alkaline earth metals, metals, ammonium and organic amines. Use in the form of such salts is in some instances preferred or necessary, as for example when employed in alkaline surface active and other compositions. It is to be understood that such salts are to be regarded as the equivalent of the present products in their free form. As examples of suitable cations, there may be mentioned sodium, potassium, lithium, calcium, strontium, barium, magnesium, iron, tin, cadmium, aluminum, antimony, chromium, manganese, mercury, nickel, silver, zinc, ammonium and aliphatic, alicyclic, aromatic and heterocyclic organic amines such as the mono-, di- and tri-methylamines, ethylamines, propylamines, laurylamines, stearylamines, ethanolamines, propanolamines, butanolamines, hexanolamines, cyclohexylamines, phenylamines, pyridylamines, morpholinylamines, and the like.

The examples in the following table are only illustrative of the present invention and are not to be regarded as limitative. In each of these examples, the nonionic surface active agent is first charged to a reactor equipped with an agitator at room temperature if a liquid and at about 70° C. or other suitable temperature if a solid at room temperature. The solid granular $P_2O_5$ is then charged to the reactor with vigorous agitation at room temperature or at a temperature up to 70° C. or more, depending upon the melting point of the nonionic agent. The $P_2O_5$ is charged over a period which ranges from about 5 minutes to one hour and usually about 15 minutes. After the initial exothermic reaction subsides the reaction mixture is heated to 100° C. and held at this temperature for about 5 hours after which the mixture is cooled and discharged. A sample of the reaction mixture is titrated with alkali to methyl orange and then to phenolphthalein as a control on the esterification.

It will be understood that all parts and proportions referred to herein and in the appended claims are by weight unless otherwise indicated.

| Example No. | Non-Ionic Surface Active Agent | Molar Ratio Agent: $P_2O_5$ | Ross-Miles Foam Test [1] 0 Min. | 5 Min. |
|---|---|---|---|---|
| 1 | Nonylphenol+2 E.O. $C_9H_{19}C_6H_4(OC_2H_4)_2OH$ | 4:1 | 0 | 0 |
| 2 | Nonylphenol+4 E.O. $C_9H_{19}C_6H_4(OC_2H_4)_4OH$ | 4:1 | 16 | 15 |
| 3 | Nonylphenol+6 E.O. $C_9H_{19}C_6H_4(OC_2H_4)_6OH$ | 4:1 | 56 | 54 |
| 4 | Nonylphenol+6 E.O. $C_9H_{19}C_6H_4(OC_2H_4)_6OH$ | 2.7:1 | 74 | 70 |
| 5 | Nonylphenol+10 E.O. $C_9H_{19}C_6H_4(OC_2H_4)_{10}OH$ | 4:1 | 110 | 91 |
| 6 | Nonylphenol+100 E.O. $C_9H_{19}C_6H_4(OC_2H_4)_{100}OH$ | 4:1 | 50 | 45 |
| 7 | Dinonylphenol+7 E.O. $C_{18}H_{38}C_6H_3(OC_2H_4)_7OH$ | 2.7:1 | 45 | 42 |
| 8 | Dodecylphenol+18 E.O. $C_{12}H_{25}C_6H_4(OC_2H_4)_{18}OH$ | 2.7:1 | 113 | 108 |
| 9 | Tridecyl alcohol+10 E.O. $C_{13}H_{27}(OC_2H_4)_{10}OH$ | 2.7:1 | 130 | 120 |
| 10 | Phenol+6 E.O. $C_6H_5(OC_2H_4)_6OH$ | 4:1 | | |
| 11 | Lauryl alcohol+4 E.O. $C_{12}H_{25}(OC_2H_4)_4OH$ | 2.5:1 | 83 | 82 |
| 12 | "Pluronic L-62" $HO(C_2H_4O)_6(C_3H_6O)_{30}(C_2H_4O)_6H$ | 2.5:1 | 0 | 0 |
| 13 | Oleic acid+5 E.O. $C_{17}H_{33}CO(OC_2H_4)_5OH$ | 4:1 | 0 | 0 |
| 14 | Nonylphenol+10 E.O. $C_9H_{19}C_6H_4(OC_2H_4)_{10}OH$ | 2.7:1 | 110 | 100 |

[1] 0.05% surfactant in tap water (40 p.p.m.) at 25° C.

As representative of a use in which the present products may be employed, a heavy duty liquid detergent composition suitable for washing cottons and the like may be formulated containing 10% of the product of Example 4 above, 15% tetrapotassium pyrophosphate, 3% sodium silicate, 3% carboxymethyl cellulose, and 71.7% water, adjusted to a pH of about 12.0 with KOH.

The products of this invention have surface active, foaming, emulsifying, wetting, and detergent properties largely dependent upon and similar to the particular nonionic surface active agent employed as reactant. Products having widely divergent ranges of properties may accordingly be produced. These products, in view of the presence therein of phosphate groups, mixtures of primary phosphate esters with secondary phosphate esters containing two nonionic residues, etc., have certain advantages relative to the corresponding sulfate esters, particularly with respect to lower acidity, more soap-like properties, controlled viscosity properties, good compatibility under diverse conditions and with the usual auxiliaries employed in common wetting, foaming, emulsifying, detergent, and dispersing compositions and the like. Similarly, the products range in appearance from waxy solids to normal viscous liquids, again depending mainly upon the type of nonionic surface active agent employed.

It will be apparent that the product hereof may be formulated with the usual alkaline substances, builders, soaps, suspending agents, brighteners, stabilizers, and the like depending upon the particular use contemplated.

This invention has been disclosed with respect to certain preferred embodiments and various modifications and variations thereof will become obvious to persons skilled in the art. It is to be understood that such modifications and variations are to be included within the spirit and scope of this invention.

What is claimed is:
1. A process comprising reacting 1 mole of $P_2O_5$ with 2 to 4.5 moles of a nonionic surface active agent having the molecular configuration of a condensation product of at least one mole of ethylene oxide with one mole of a compound containing about 6 to 150 carbon atoms and a reactive hydrogen atom and selected from the group consisting of phenol, alkyl phenols, aliphatic alcohols, fatty acids, fatty amines, fatty amides, rosin amines, long chain sulfonamides, long chain-substituted aryl sulfonamides, and high molecular weight mercaptans under substantially anhydrous conditions and at a temperature below about 110° C. down to about room temperature.

2. A process as defined in claim 1 wherein said compound is an alkyl phenol of at least 10 carbon atoms.

3. A process as defined in claim 1 wherein said compound is a multi-branched chain primary aliphatic alcohol having the molecular configuration of an alcohol produced by the Oxo process from a polyolefin of at least 7 carbon atoms.

4. A process as defined in claim 1 wherein said compound is a straight chain aliphatic alcohol of at least 10 carbon atoms.

5. A process comprising gradually adding with agitation one mole of dry, solid $P_2O_5$ to 2 to 4.5 moles of a nonionic surface active agent having the molecular configuration of a condensation product of at least one mole of ethylene oxide with one mole of a compound containing about 6 to 150 carbon atoms and a reactive hydrogen atom and selected from the group consisting of phenol, alkyl phenols, aliphatic alcohols, fatty acids, fatty amines, fatty amides, rosin amines, long chain sulfonamides, long chain-substituted aryl sulfonamides, and high molecular weight mercaptans, and allowing the phosphation reaction to proceed under substantially anhydrous conditions and at a temperature below about 110° C. down to about room temperature.

6. A process as defined in claim 5 wherein said compound is an alkyl phenol of at least 10 carbon atoms.

7. A process as defined in claim 5 wherein said compound is a multi-branched chain primary aliphatic alcohol having the molecular configuration of an alcohol produced by the Oxo process from a polyolefin of at least 7 carbon atoms.

8. A process as defined in claim 5 wherein said compound is a straight chain aliphatic alcohol of at least 10 carbon atoms.

9. A surface active composition produced by the process of claim 1.

10. A surface active composition produced by the process of claim 2.

11. A surface active composition produced by the process of claim 3.

12. A surface active composition produced by the process of claim 4.

References Cited in the file of this patent
FOREIGN PATENTS
1,139,717 France _____ July 4, 1957